(12) United States Patent
Hirayama

(10) Patent No.: US 9,904,991 B2
(45) Date of Patent: Feb. 27, 2018

(54) IMAGE PICKUP APPARATUS THAT CORRECTS CONTRAST OF IMAGE, CONTROL METHOD FOR THE IMAGE PICKUP APPARATUS, AND STORAGE MEDIUM

(71) Applicant: CANON KABUSHIKI KAISHA, Tokyo (JP)

(72) Inventor: Shingo Hirayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/223,180

(22) Filed: Jul. 29, 2016

(65) Prior Publication Data

US 2017/0039688 A1 Feb. 9, 2017

(30) Foreign Application Priority Data

Aug. 7, 2015 (JP) .................. 2015-157132

(51) Int. Cl.
*G06T 5/00* (2006.01)
*G06T 5/40* (2006.01)

(52) U.S. Cl.
CPC .............. *G06T 5/008* (2013.01); *G06T 5/009* (2013.01); *G06T 5/40* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 2004/0179111 A1* | 9/2004 | Hattori | ................... | H04N 5/235 348/222.1 |
| 2011/0229019 A1* | 9/2011 | Batur | ..................... | H04N 5/217 382/159 |
| 2014/0152686 A1* | 6/2014 | Narasimha | ............. | G09G 5/377 345/589 |
| 2014/0333726 A1* | 11/2014 | Tokui | ..................... | H04N 5/208 348/46 |
| 2015/0201109 A1* | 7/2015 | Li | ........................ | H04N 1/4074 348/222.1 |
| 2016/0104273 A1* | 4/2016 | Urakami | ................... | G06T 5/40 382/169 |

FOREIGN PATENT DOCUMENTS

| | | | | |
|---|---|---|---|---|
| JP | 2006-098614 A | | 4/2006 | |
| JP | 2016076908 A | * | 5/2016 | ............... G06T 5/40 |

* cited by examiner

*Primary Examiner* — Bernard Krasnic
(74) *Attorney, Agent, or Firm* — Cowan, Liebowitz & Latman, P.C.

(57) ABSTRACT

An image pickup apparatus which is capable of appropriately correcting the contrast of an image. A luminance histogram is detected from an image including a subject, and a subject distance to the subject is measured. A frequency percentage, which defines a luminance range in the luminance histogram for use in calculating a control point for a tone curve used to correct contrast of the image, is decided according to the subject distance. The frequency percentage is higher when the subject distance is long than when the subject distance is short.

6 Claims, 8 Drawing Sheets

| 300 m | 300 m | 300 m |
|-------|-------|-------|
| 200 m | 200 m | 200 m |
| 100 m | 100 m | 100 m |

| 20 % | 20 % | 20 % |
|------|------|------|
| 15 % | 15 % | 15 % |
| 10 % | 10 % | 10 % |

IMAGE PICKUP APPARATUS THAT CORRECTS CONTRAST OF IMAGE, CONTROL METHOD FOR THE IMAGE PICKUP APPARATUS, AND STORAGE MEDIUM

BACKGROUND OF THE INVENTION

Field of the Invention

The present invention relates to an image pickup apparatus which corrects the contrast of an image, a control method for the image pickup apparatus, and a storage medium.

Description of the Related Art

Conventionally, there is known a correction method to correct the contrast of an image obtained by shooting (see, for example, Japanese Laid-Open Patent Publication (Kokai) No. 2006-98614). According to the correction method described in Japanese Laid-Open Patent Publication (Kokai) No. 2006-98614, a tone curve for use in correcting the contrast of an image is generated from a luminance histogram of the image. Specifically, a low-tone area of the tone curve is calculated from a frequency distribution (frequency percentage) of low luminance in the luminance histogram, and a high-tone area of the tone curve is calculated from a frequency distribution of high luminance in the luminance histogram, and a mid-tone area of the tone curve is calculated from the low-tone area and the high-tone area. The contrast of an image is then corrected using a calculated tone curve across the overall tone range. As a result, an image with smooth tone continuity across the overall image is obtained.

Some images whose contrast is to be corrected are at least partially blurred (hereafter referred to as a "blurred image"). A blurred image may include not only a subject whose subject distance, which is a distance from an image pickup apparatus to a subject, is short (hereafter referred to as a "short-distance subject") but also a subject whose subject distance is long (hereafter referred to as a "long-distance subject"). Due to the subject distance being long, shooting of a long-distance subject tends to be more affected by dust floating in the air and sunlight diffusely reflected by moisture in the air than shooting of a short-distance subject. For this reason, in a blurred image, an edge of a long-distance subject tends to be more difficult to recognize than an edge of a short-distance subject. It should be noted that an edge of a subject is made easier to recognize by correcting the contrast of an image of the subject, and the processing intensity with which contrast is corrected depends on a tone curve, and more particularly, its slope.

However, according to the correction method described in Japanese Laid-Open Patent Publication (Kokai) No. 2006-98614, a tone curve is calculated from a histogram across the board regardless of the distance to a subject, and this presents a problem that it is impossible to appropriately correct the contrasts of images of respective subjects. For example, the processing intensity of contrast correction using a calculated tone curve may be too low to correct the contrast of an image of a long-distance subject and may not satisfactorily enhance an edge of the long-distance subject. Also, the processing intensity of contrast correction using a calculated tone curve may be too high to correct the contrast of an image of a short-distance subject and may excessively enhance an edge of the short-distance subject.

SUMMARY OF THE INVENTION

The present invention provides an image pickup apparatus that is capable of appropriately correcting the contrast of an image, a control method for the image pickup apparatus, and a storage medium.

Accordingly, the present invention provides an image pickup apparatus that picks up an image of a subject, comprising a detecting unit configured to detect a luminance histogram from an image including the subject, a distance measurement unit configured to measure a subject distance to the subject, and a deciding unit configured to, according to the subject distance, decide a frequency percentage that defines a luminance range in the luminance histogram for use in calculating a control point for a tone curve used to correct contrast of the image, wherein the frequency percentage is higher when the subject distance is long than when the subject distance is short.

According to the present invention, the contrast of an image is appropriately corrected.

Further features of the present invention will become apparent from the following description of exemplary embodiments (with reference to the attached drawings).

DESCRIPTION OF THE EMBODIMENTS

Hereafter, a first embodiment of the present invention will be described in detail with reference to the drawings.

Figure 1:
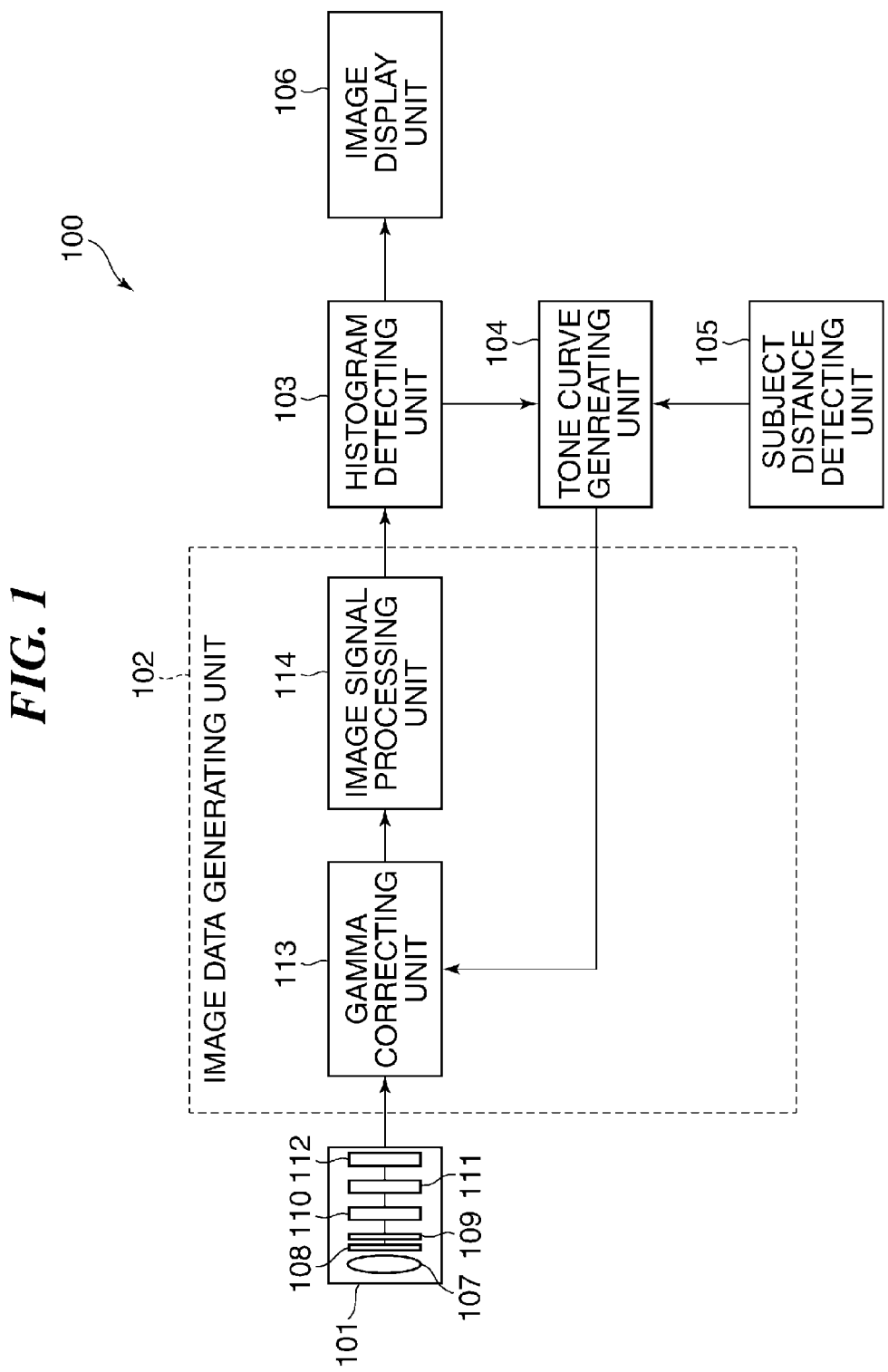
FIG. 1 is a block diagram schematically showing an internal arrangement of an image pickup apparatus according to a first embodiment of the present invention.

FIG. 1 is a block diagram schematically showing an internal arrangement of an image pickup apparatus 100 according to the first embodiment of the present invention.

The image pickup apparatus 100 in FIG. 1 has an image pickup unit 101, an image data generating unit 102, a histogram detecting unit 103, a tone curve generating unit 104, a subject distance detecting unit 105, and an image display unit 106. The image pickup unit 101 has a lens group 107, which is comprised of a plurality of lenses, an IRCF (infrared ray cut filter) 108, and an image pickup device 109 such as a CCD sensor or a CMOS sensor. The image pickup unit 101 also has a CDS (correlated double sampling) circuit 110, an AGC (automatic gain control) amplifier 111, and an A/D converter 112. The image data generating unit 102 has a gamma correction unit 113 and an image signal processing unit 114.

When the image pickup apparatus 100 shoots a subject, an optical image is formed on the image pickup device 109 through the lens group 107 and the IRCF 108. The image pickup device 109 performs photoelectric conversion of the formed optical image and transmits analog image signal. The CDS circuit 110 receives an analog image signal from the image pickup device 109 and performs, for example, correlated double sampling on the received analog image signal. The AGC amplifier 111 receives an analog image signal from the CDS circuit 110 and carries out, for example, an amplification process on the received analog image signal. The A/D converter 112 receives an analog image signal from the AGC amplifier 111 and converts the received analog image signal into a digital image signal. The image data generating unit 102 receives the digital image signal and generates image data based on the received digital image signal.

Figure 2A:
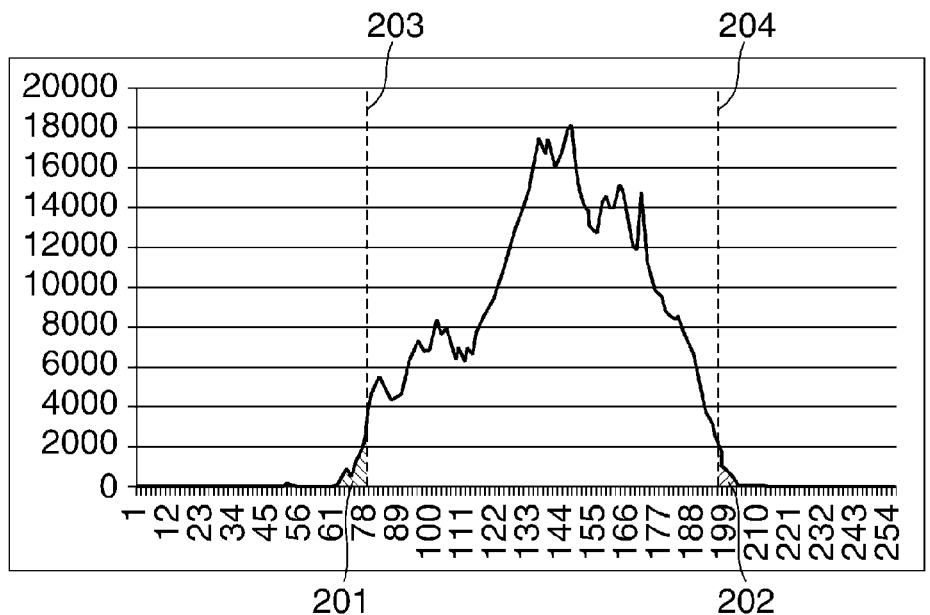
FIGS. 2A and 2B are views useful in explaining a luminance histogram that is detected by a histogram detecting unit in FIG. 1, FIG. 2A showing the luminance histogram, and FIG. 2B showing a tone curve obtained from the luminance histogram.

The histogram detecting unit 103 detects a luminance histogram (FIG. 2A) showing the distribution of luminance levels in generated image data and outputs the image data to the image display unit 106. The tone curve generating unit 104 generates a tone curve, which is for use in correcting the contrast of an image, from a luminance histogram detected by the histogram detecting unit 103 and sends the tone curve to the gamma correction unit 113. The subject distance detecting unit 105 measures subject distances to respective subjects in an optical image based on, for example, a zoom position and a focus positions of each lens and sends the measured subject distances to the tone curve generating unit 104. The gamma correction unit 113 carries out a gamma correction process on image data using a tone curve received from the tone curve generating unit 104. The image signal processing unit 114 subjects image data to processes other than the gamma correction process, for example, a color conversion process, an AE process, and a WB process.

A description will now be given of a generating process in which the tone curve generating unit 104 generates a tone curve based on a luminance histogram detected by the histogram detecting unit 103.

The tone curve generating unit 104 receives a subject distance from the subject distance detecting unit 105 and obtains (determines) a low-luminance side frequency percentage 201 and a high-luminance side frequency percentage 202 determined in advance according to the subject distance. The low-luminance side frequency percentage 201 is a proportion of an integral value of luminance levels within a predetermined luminance range on a low-luminance side to an integral value of all luminance levels in the luminance histogram and is used to calculate a low-luminance side control point 203 which is a threshold between a low-tone area and a mid-tone area of a tone curve. Specifically, the low-luminance side frequency percentage 201 defines a luminance range for use in calculating the low-luminance side control point 203. The high-luminance side frequency percentage 202 is a proportion of an integral value of luminance levels within a predetermined luminance range on a high-luminance side to an integral value of all luminance levels in the luminance histogram and is used to calculate a high-luminance side control point 204 which is a threshold between a mid-tone area and a high-tone area of a tone curve. Specifically, the high-luminance side frequency percentage 202 defines a luminance range for use in calculating the high-luminance side control point 204.

Figure 2B:
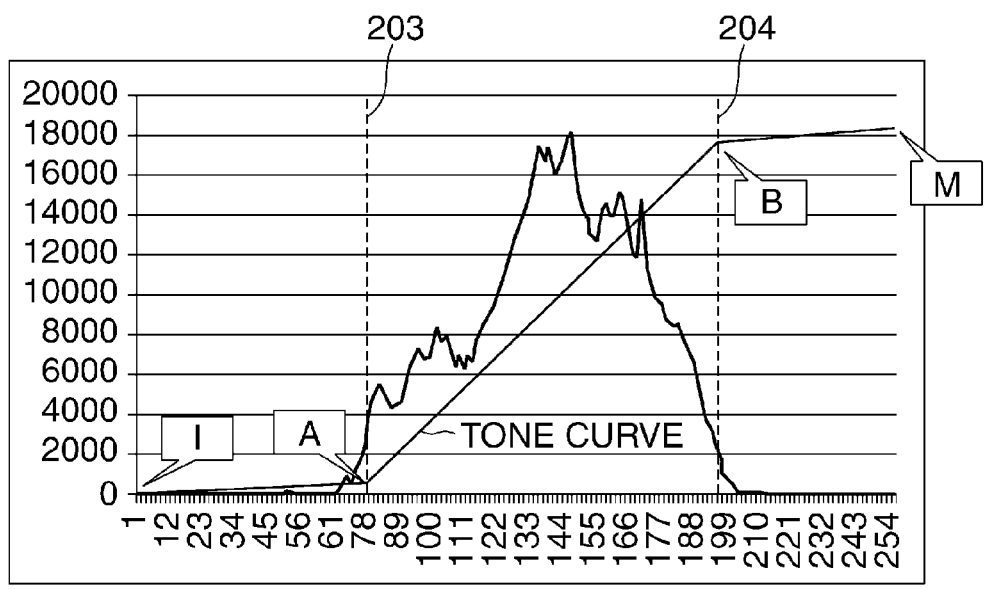

The tone curve generating unit 104 calculates the low-luminance side control point 203 and the high-luminance side control point 204 from the obtained low-luminance side frequency percentage 201 and high-luminance side frequency percentage 202 and generates a tone curve (FIG. 2B) using an equation 1 below. It should be noted that in the equation 1 below, a point A corresponds to the low-luminance side control point 203, and a point B corresponds to the high-luminance side control point 204.

[Mathematical Expression 1]

$$t(x) = \begin{cases} \dfrac{A_y}{A_x} I_x & (0 \leq I_x < A_x) \\ \dfrac{I_x - A_x}{B_x - A_x}(B_y - A_y) + A_y & (A_x \leq I_x < B_x) \\ \dfrac{I_x - B_x}{M_x - B_x}(M_y - B_y) + B_y & (B_x \leq I_x \leq M_x) \end{cases} \quad \text{(Equation 1)}$$

t(x): a value (luminance frequency) in a y-axis direction of a tone curve in a luminance histogram Ax, Ay: x, y coordinates at a point A on the tone curve in the luminance histogram Bx, By: x, y coordinates at a point B on the tone curve in the luminance histogram Ix, Iy: x, y coordinates at a point I on the tone curve in the luminance histogram Mx, My: x, y coordinates at a point M on the tone curve in the luminance histogram In general, a low-tone area of a tone curve is used for correction performed on a low-luminance area of image data and enhances the darkness of the low-luminance area. A high-tone area of a tone curve is used for correction performed on a high-luminance area of image data and enhances the brightness of the low-luminance area. A mid-tone area of a tone curve is used for correction performed on a mid-luminance area of image data and makes a difference between light and dark areas smooth. The greater a low-tone area and a high-tone area of a tone curve, the greater an area where brightness or darkness is enhanced in image data, and hence the more enhanced the contrast of the entire image data. Namely, the greater a low-tone area and a high-tone area of a tone curve, the higher the processing intensity with which the contrast of image data is corrected. It should be noted that the greater a low-tone area and a high-tone area of a tone curve, the shorter the distance between the low-luminance side control point 203 and the high-luminance side control point 204, and hence the steeper the slopes of tone curves. Therefore, using a tone curve with a steeper slope leads to a higher processing strength of contrast correction.

Figure 3A:
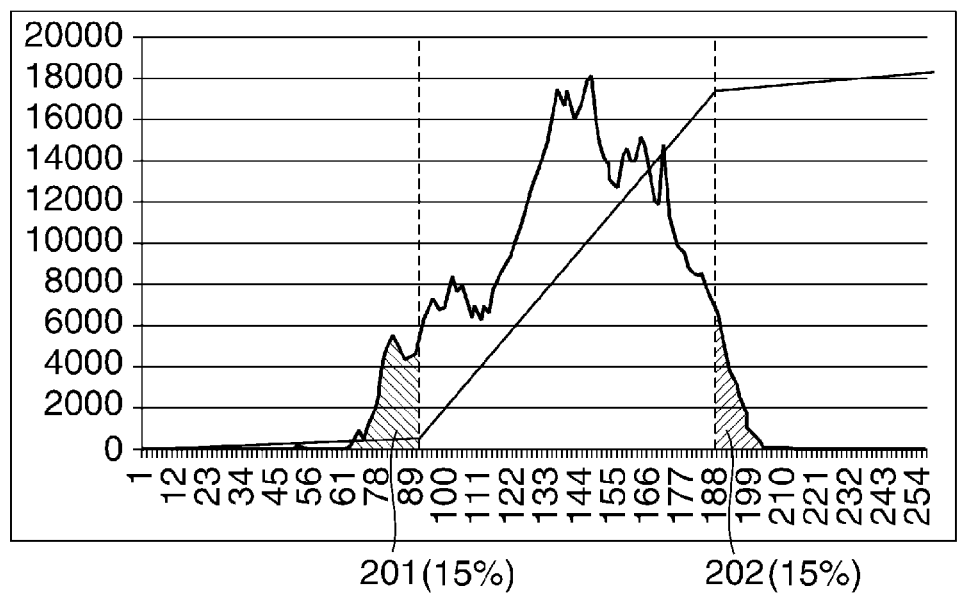
FIGS. 3A and 3B are views useful in explaining the relation between slopes of tone curves generated by a tone curve generating unit in FIG. 1 and a low-luminance side frequency percentage and a high-luminance side frequency percentage, FIG. 3A showing a slope of a tone curve in a case where the low-luminance side frequency percentage and the high-luminance side frequency percentage are high, and FIG. 3B showing a slope of a tone curve in a case where the low-luminance side frequency percentage and the high-luminance side frequency percentage are low.
Figure 3B:
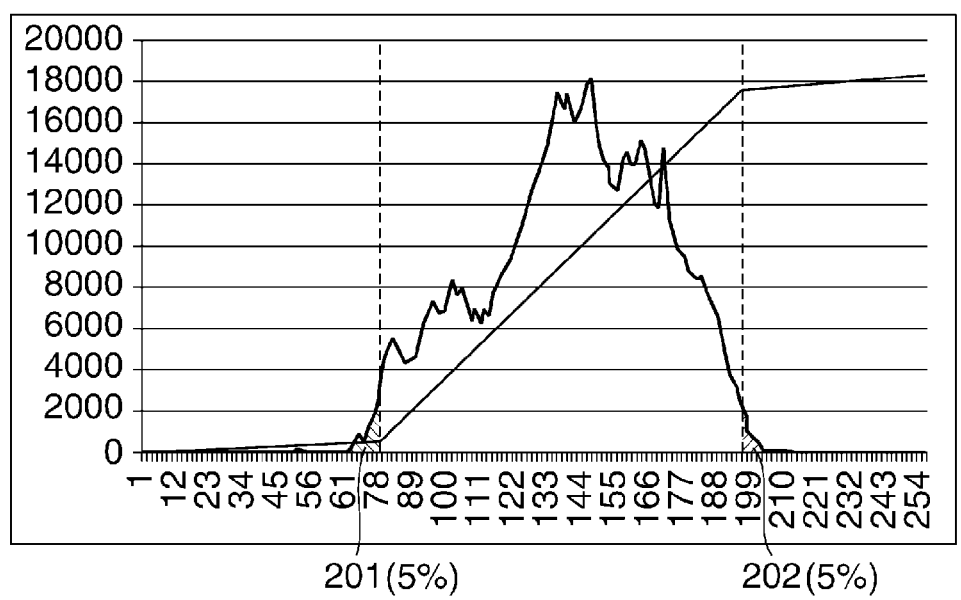

As described above, the longer the subject distance, the harder it is to recognize a subject's edge. Accordingly, in the present embodiment, as the subject distance increases, the low-luminance side frequency percentage 201 and the high-luminance side frequency percentage 202 are set to increase, and the slope of a generated tone curve becomes steeper. For example, when the subject distance is equal to or longer than 200 m and shorter than 300 m, the low-luminance side frequency percentage 201 and the high-luminance side frequency percentage 202 are set to 15%. When the subject distance is equal to or longer than 100 m and shorter than 200 m, the low-luminance side frequency percentage 201 and the high-luminance side frequency percentage 202 are set to 10%. When the subject distance is equal to or longer than 0 m and shorter than 100 m, the low-luminance side frequency percentage 201 and the high-luminance side frequency percentage 202 are set to 5%. A tone curve is generated individually in each case, and image data is subjected to a gamma correction process using the generated tone curve. Here, when the low-luminance side frequency percentage 201 and the high-luminance side frequency percentage 202 are 15%, a low-tone area and a high-tone area of a generated tone curve are relatively large, and hence the slope of the tone curve (FIG. 3A) is steep. When the low-luminance side frequency percentage 201 and the high-luminance side frequency percentage 202 are 5%, a low-tone area and a high-tone area of a generated tone curve are relatively small, and hence the slope of the tone curve (FIG. 3B) is gentle. Namely, in gamma correction performed on an image including a subject with a long subject distance, a tone curve with a steep slope is used to correct contrast with high processing intensity. In gamma correction preformed on an image including a subject with a short subject distance, a tone curve with a gentle slope is used to correct contrast with low processing intensity.

Figure 4:
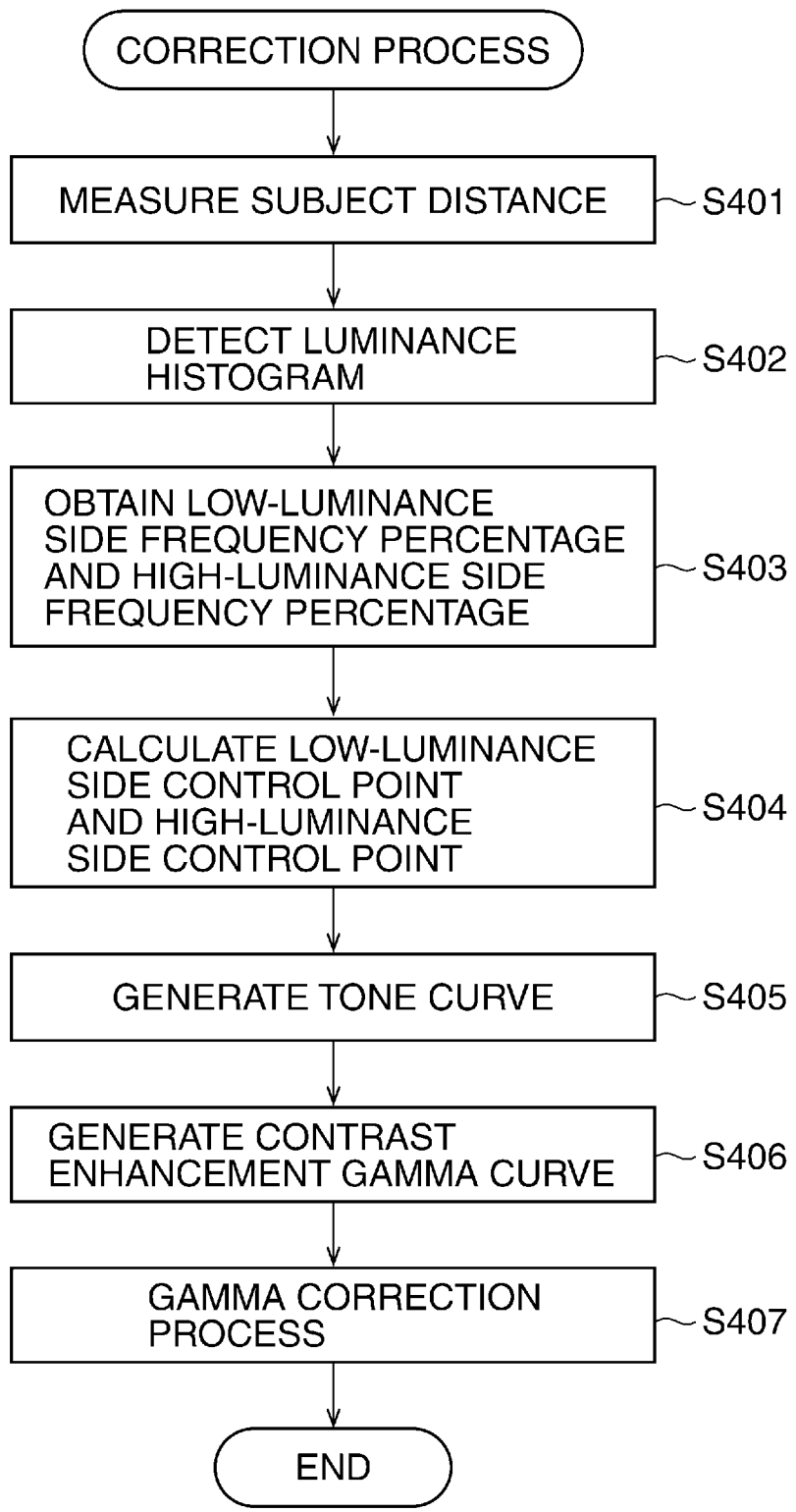
FIG. 4 is a flowchart showing the procedure of a correction process that is carried out by the image pickup apparatus in FIG. 1.

FIG. 4 is a flowchart showing the procedure of a correction process that is carried out by the image pickup apparatus in FIG. 1.

Referring to FIG. 4, first, the subject distance detecting unit 105 measures a subject distance (step S401), and the hygrogram detecting unit 103 detects a luminance histogram based on image data generated by the image data generating unit 102 (step S402). Next, the tone curve generating unit 104 obtains the low-luminance side frequency percentage 201 and the high-luminance side frequency percentage 202 according to the measured subject distance (step S403). Then, the tone curve generating unit 104 calculates the low-luminance side control point 203 and the high-luminance side control point 204 from the luminance histogram as well as the low-luminance side frequency percentage 201 and the high-luminance side frequency percentage 202 (step S404). After that, the tone curve generating unit 104 generates a tone curve using the equation 1 above (step S405).

Then, the gamma correction unit 113 reflects the generated tone curve on a gamma curve using an equation 2 below to generate a contrast enhancement gamma curve (step S406).

[Mathematical Expression 2]

$$h(x)=g(t(x))$$ (Equation 2)

h(x): gamma curve for contrast enhancement
g(x): normal gamma curve
t(x): tone curve Then, the gamma correction unit 113 subjects the image data to a gamma correction process based on the contrast enhancement gamma curve (step S407), followed by the present process being terminated.

According to the present embodiment, the low-luminance side frequency percentage 201 and the high-luminance side frequency percentage 202 for calculating the low-luminance side control point 203 and the high-luminance side control point 204 are higher when the subject distance is long than when the subject distance is short (step S403). As the low-luminance side frequency percentage 201 and the high-luminance side frequency percentage 202 increase, the slope of a tone curve becomes steeper, and the processing intensity of contrast correction increases. Therefore, when the subject distance is long, image data on a subject is subjected to contrast correction with high processing intensity, and hence a subject whose edge is hard to recognize due to its long subject distance is more easily recognized. Namely, the contrast of an image is appropriately corrected.

A detailed description will now be given of a second embodiment of the present invention with reference to the drawings. The second embodiment of the present invention is basically the same as the first embodiment described above in terms of constructions and operations, differing from the first embodiment in that the low-luminance side frequency percentage 201 and the high-luminance side frequency percentage 202 are maintained at a predetermined value when the subject distance is shorter than a threshold value. Features of constructions and operations that are the same as those in the first embodiment will thus not be described, only constructions and operations different from those of the first embodiment being described below.

Figure 5:
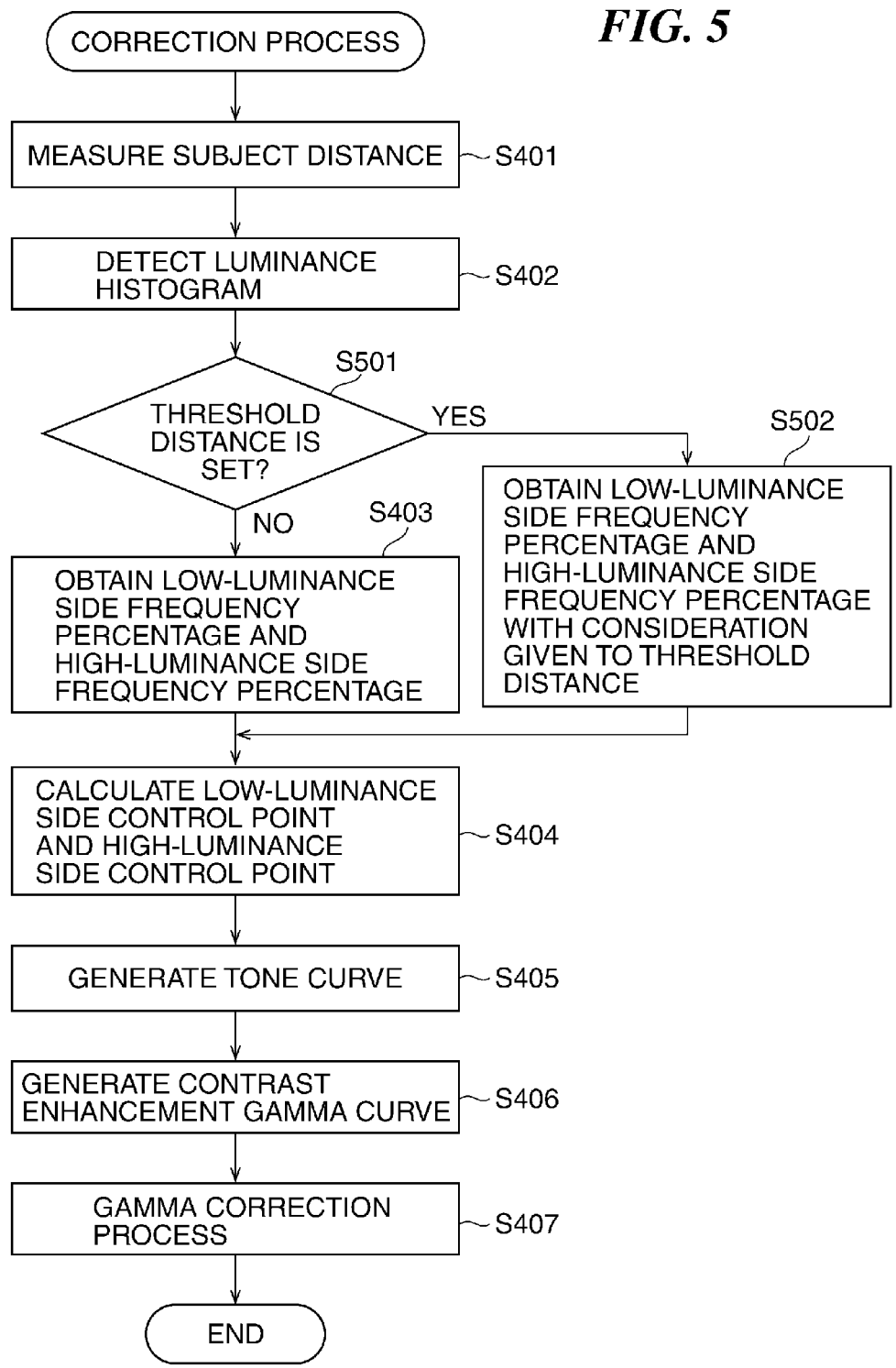
FIG. 5 is a flowchart showing the procedure of a correction process that is carried out by an image pickup apparatus according to a second embodiment of the present invention.

FIG. 5 is a flowchart showing the procedure of a correction process that is carried out by an image pickup apparatus 100 according to the second embodiment of the present invention. Steps S401 to S407 in FIG. 5 are the same as the steps S401 to S407 in FIG. 4, and therefore, only differences from FIG. 4 will be described below.

Referring to FIG. 5, when the histogram detecting unit 103 detects a luminance histogram (step S402), the tone curve generating unit 104 determines whether or not a threshold distance is set in advance in the image pickup apparatus 100 (step S501). As a result in the determination in the step S501, when no threshold distance is set in advance in the image pickup apparatus 100, the process proceeds to the step S403.

On the other hand, when a threshold distance is set in advance in the image pickup apparatus 100, the tone curve generating unit 104 obtains the low-luminance side frequency percentage 201 and the high-luminance side frequency percentage 202 according to a subject distance with consideration given to the threshold distance (step S502). For example, when the threshold distance is set to 250 m, and the subject distance is shorter than 250 m, the low-luminance side frequency percentage 201 and the high-luminance side frequency percentage 202 are maintained at 5% (a predetermined value). On the other hand, when the subject distance is equal to or longer than 250 m, and the subject distance is equal to or longer than 250 m and shorter than 350 m, the low-luminance side frequency percentage 201 and the high-luminance side frequency percentage 202 are set to 10%. Further, when the subject distance is equal to or longer than 350 m and shorter than 450 m, the low-luminance side frequency percentage 201 and the high-luminance side frequency percentage 202 are maintained at 15%. After that, the process proceeds to the step S404.

According to the process in FIG. 5, when the subject distance is shorter than a threshold value, for example, 250 m, the low-luminance side frequency percentage 201 and the high-luminance side frequency percentage 202 are maintained at a predetermined value, for example, 5% (step S502). When subject distance is shorter than 250 m, this means that the distance to a subject is short, and when contrast correction with high processing intensity is performed on the image of the subject, the subject may become harder to recognize. At this time, the low-luminance side frequency percentage 201 and the high-luminance side frequency percentage 202 are maintained at 5%, and hence the slope of a tone curve generated from the low-luminance side frequency percentage 201 and the high-luminance side frequency percentage 202 is unchanged, and the processing intensity of contrast correction on the subject is constant. This prevents an image of a subject at a short distance from being subjected to contrast correction with higher processing strength than necessary and making the subject hard to recognize.

A detailed description will now be given of a third embodiment of the present invention with reference to the drawings. The third embodiment of the present invention is basically the same as the first embodiment described above in terms of constructions and operations, differing from the first embodiment in that a plurality of subjects is spread out over image data. Features of constructions and operations that are the same as those in the first embodiment will thus not be described, only constructions and operations different from those of the first embodiment being described below.

Figure 6:
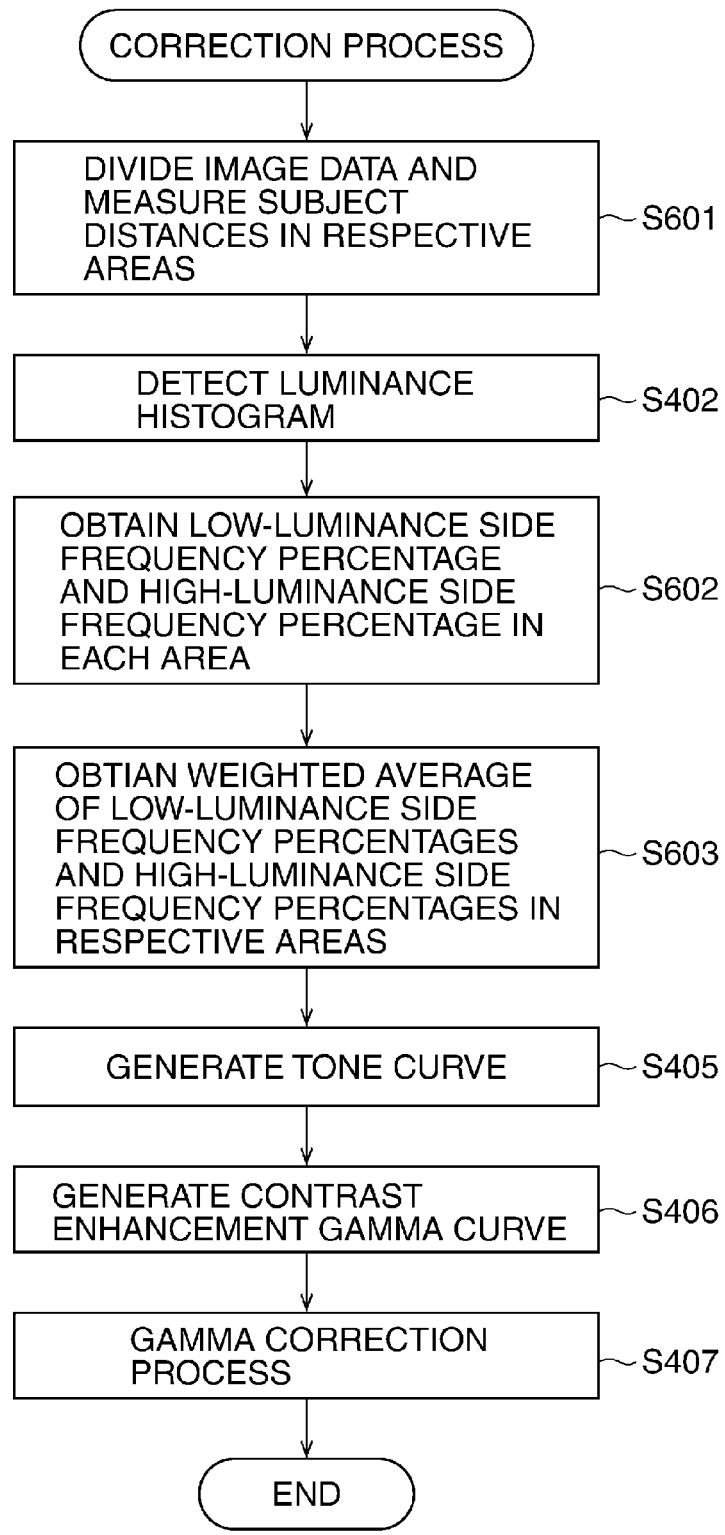
FIG. 6 is a flowchart showing the procedure of a correction process that is carried out by an image pickup apparatus according to a third embodiment of the present invention.

FIG. 6 is a flowchart showing the procedure of a correction process that is carried out by an image pickup apparatus 100 according to the third embodiment of the present invention. Steps S401 to S407 in FIG. 6 are the same as the steps S401 to S407 in FIG. 4, and therefore, only differences from FIG. 4 will be described below.

Figures 7, 8, 9:
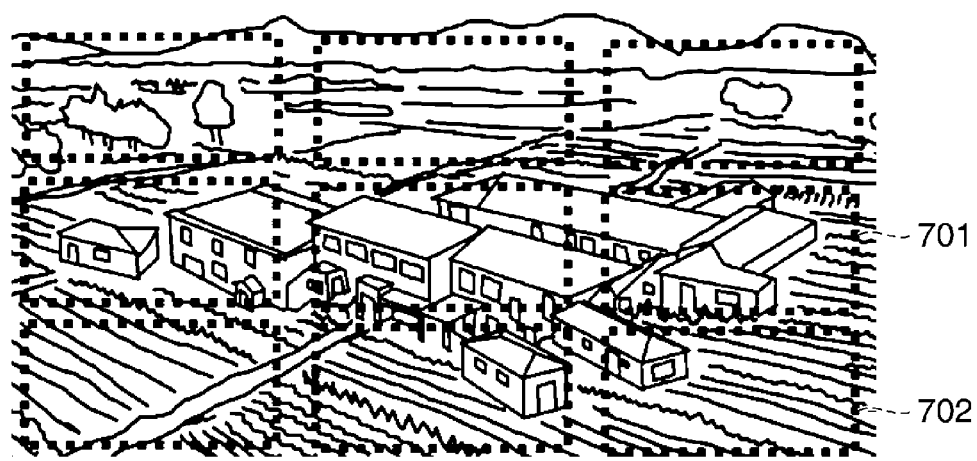
FIG. 7 is a view useful in explaining image data divided into a plurality of areas in step S601 in FIG. 6.
FIG. 8 is a view useful in explaining distance measurement results obtained by measuring subject distances to subjects included in the respective areas of the image data in FIG. 7.
FIG. 9 is a view useful in explaining a low-luminance side frequency percentage and a high-luminance side frequency percentage in each of areas obtained in step S602 in FIG. 6.

Referring to FIG. 6, first, the subject distance detecting unit 105 divides image data into a plurality of areas correspondingly to a plurality of subjects and measures subject distances to the subjects included in the respective areas (step S601). In the present embodiment, the subject distance detecting unit 105 divides image data into, for example, nine areas including an area 701 and an area 702 adjacent to the area 701 as shown in FIG. 7 and measures subject distances to subjects included in the respective areas to obtain measurements results for the respective areas as shown in FIG. 8, for example.

Next, the histogram detecting unit 103 detects a luminance histogram from the image data generated by the image data generating unit 102 (step S402). Then, the tone curve generating unit 104 obtains the low-luminance side frequency percentages 201 and the high-luminance side frequency percentages 202, for example, as shown in FIG. 9 according to the measured subject distances to the subjects included in the respective areas (step S602). In the present embodiment, for example, in an area where the subject distance is equal to or longer than 0 m and shorter than 100 m, the low-luminance side frequency percentage 201 and the high-luminance side frequency percentage 202 are set to 5%. In an area where the subject distance is equal to or longer than 100 m and shorter than 200 m, the low-luminance side frequency percentage 201 and the high-luminance side frequency percentage 202 are set to 10%. In an area where the subject distance is equal to or longer than 200 m and shorter than 300 m, the low-luminance side frequency percentage 201 and the high-luminance side frequency percentage 202 are set to 15%. In an area where the subject distance is equal to or longer than 300 m, the low-luminance side frequency percentage 201 and the high-luminance side frequency percentage 202 are set to 20%.

The tone curve generating unit 104 obtains a weighted average of the obtained low-luminance side frequency percentages 201 and high-luminance side frequency percentages 202 in the respective areas to calculate the low-luminance side frequency percentage 201 and the high-luminance side frequency percentage 202 that are to be applied to the entire image data (step S603). In the step S603, to obtain a weighted average of the low-luminance side frequency percentages 201 and the high-luminance side frequency percentages 202 in the respective areas, the low-luminance side frequency percentages 201 and the high-luminance side frequency percentages 202 in the respective areas are multiplied by weight coefficients. The weight coefficients are determined for the respective areas, and for example, a weight coefficient for an area including a subject that draws a lot of attention from a user although it is hard to recognize due to its long subject distance is set to a greater value than a weight coefficient for an area including a subject at a short subject distance or an area including a subject that draws little attention from a user. After that, the process proceeds to the step S405.

According to the process in FIG. 6, image data is divided into a plurality of areas, and subject distances to subjects included in the respective areas are measured (step S601). Further, the low-luminance side frequency percentages 201 and the high-luminance side frequency percentages 202 in the respective areas are obtained according to the subject distances to the subjects included in the respective areas (step S602). After that, a weighted average of the obtained low-luminance side frequency percentages 201 and high-luminance side frequency percentages 202 in the respective areas is obtained to calculate the low-luminance side frequency percentage 201 and the high-luminance side frequency percentage 202 for entire image data (step S603). Weight coefficients for use in obtaining the weighted average are determined for the respective areas. At this time, a weight coefficient for an area including a subject that draws a lot of attention from a user although it is hard to recognize due to its long subject distance is set to a greater value than a weight coefficient for an area including a subject at a short subject distance or an area including a subject that draws little attention from a user. As a result, even when only a tone curve to be applied to entire image data is generated and used in a correction process without generating tone curves for respective areas, the contrast of an edge of a subject that draws a lot of attention from a user is reliably enhanced.

It should be noted that although in the process in FIG. 6, the low-luminance side frequency percentage 201 and the high-luminance side frequency percentage 202 that are to be applied to entire image data are calculated by obtaining a weighted average of the obtained low-luminance side frequency percentages 201 and high-luminance side frequency percentages 202 in the respective areas, they may be calculated by obtaining a simple average of the obtained low-luminance side frequency percentages 201 and high-luminance side frequency percentages 202 in the respective areas.

A detailed description will now be given of a fourth embodiment of the present invention with reference to the drawings. The fourth embodiment of the present invention is basically the same as the third embodiment described above in terms of constructions and operations, differing from the third embodiment in that a tone curve is generated on an area-by-area basis. Features of constructions and operations that are the same as those in the third embodiment will thus not be described, only constructions and operations different from those of the third embodiment being described below.

Figure 10:
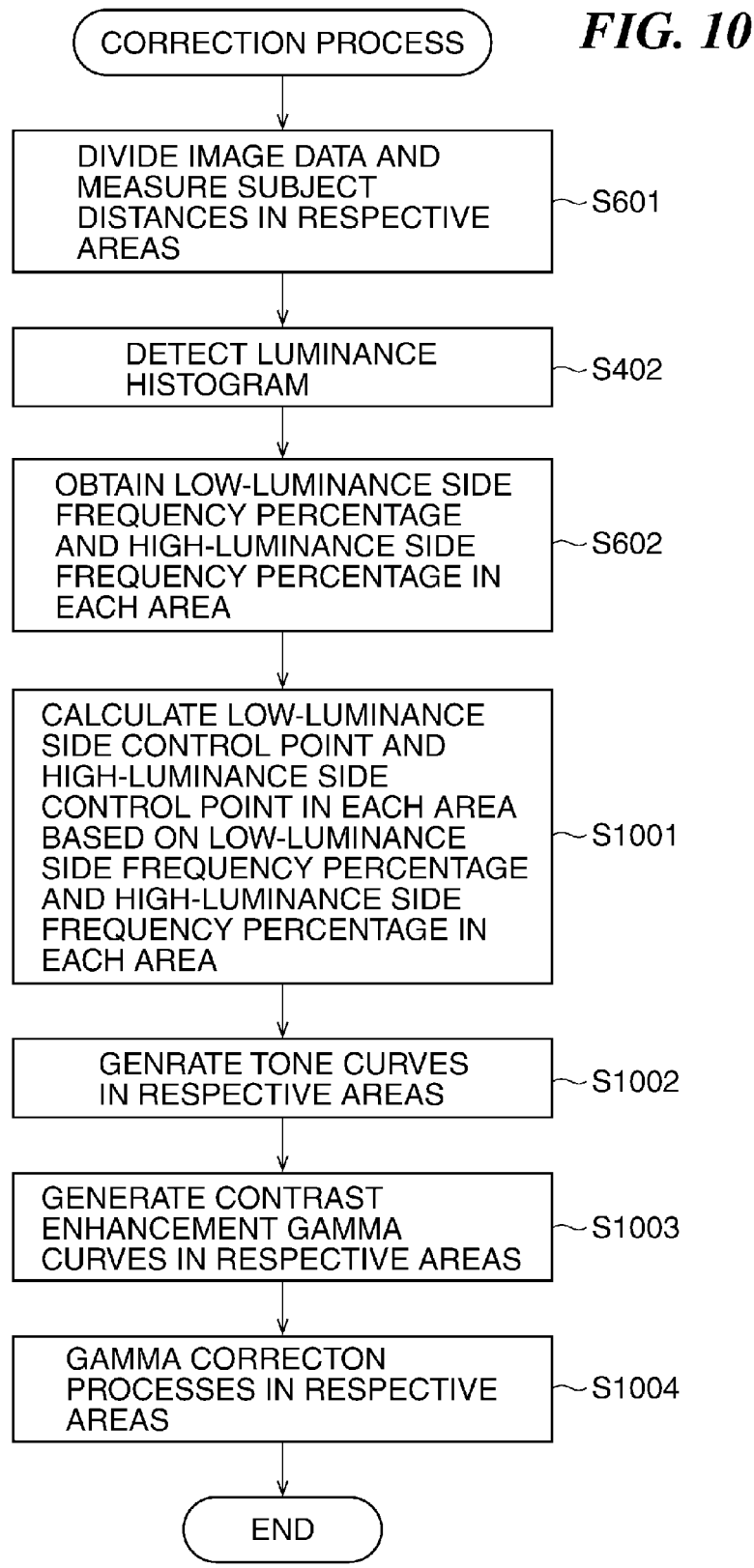
FIG. 10 is a flowchart showing the procedure of a correction process that is carried out by an image pickup apparatus according to a fourth embodiment of the present invention.

FIG. 10 is a flowchart showing the procedure of a correction process that is carried out by an image pickup apparatus 100 according to the fourth embodiment of the present invention. Steps S402 and S601 to S602 in FIG. 10 are the same as the steps S402 and S601 to S602 in FIG. 6, and therefore, only differences from FIG. 6 will be described below.

Referring to FIG. 10, first, the low-luminance side frequency percentages 201 and the high-luminance side frequency percentages 202 are obtained according to measured subject distances to subjects included in respective areas (steps S602, S602). Next, the tone curve generating unit 104 calculates the low-luminance side control points 203 and the high-luminance side control points 204 from the low-luminance side frequency percentages 201 and the high-luminance side frequency percentages 202 in the respective areas (step S1001). Then, the tone curve generating unit 104 generates tone curves in the respective areas using the equation 1 above (step S1002).

After that, the gamma correction unit 113 reflects the generated tone curves in the respective areas on gamma curves in the respective areas using the equation 2 above to generate contrast enhancement gamma curves for the respective areas (step S1003). Then, the gamma correction unit 113 subjects image data in the respective areas to gamma correction processes based on the contrast enhancement gamma curves for the respective areas (step S1004), followed by the present process being terminated.

According to the process in FIG. 10, the low-luminance side control points 203 and the high-luminance side control points 204 are calculated from the low-luminance side frequency percentages 201 and the high-luminance side frequency percentages 202 obtained according to measured subject distances to subjects included in respective areas (step 1001). Based on the low-luminance side control points 203 and the high-luminance side control points 204 for the respective areas thus calculated, tone curves in the respective areas are generated (step S1002). As a result, on an area-by-area basis, contrast is corrected according to a subject distance, and hence, for example, even when a plurality of subjects at different subject distances is scattered across image data, contrasts of the respective subjects are corrected with consideration given to the subject distances to the respective subjects.

In the process in FIG. 10, for example, it may be further determined whether or not a difference between the low-luminance side frequency percentage 201 and the high-luminance side frequency percentage 202 in the area 701 and the low-luminance side frequency percentage 201 and the high-luminance side frequency percentage 202 in the area 702 (hereafter referred to as "the frequency percentage difference") is equal to or greater than a predetermined value. When the frequency percentage difference is equal to or greater than the predetermined value, and tone curves generated from the area 701 and the area 702 are used, there is a great difference in slope between the tone curves generated from the area 701 and the area 702. Therefore, processing intensities of contrast correction performed on the area 701 and the area 702 may greatly differ from each other, and tone continuity may be lost in the area 701 and the area 702 after they are subjected to contrast correction. To address this, in order that the frequency percentage difference can be smaller than the predetermined value, the tone curve generating unit 104 changes the low-luminance side frequency percentage 201 and the high-luminance side frequency percentage 202 in each area. For example, assume that when the predetermined value for the frequency percentage difference is 3%, a value of 15% is obtained as the low-luminance side frequency percentage 201 and the high-luminance side frequency percentage 202 in the area 701, and a value of 10% is obtained as the low-luminance side frequency percentage 201 and the high-luminance side frequency percentage 202 in the area 702. In this case, the low-luminance side frequency percentage 201 and the high-luminance side frequency percentage 202 in each area are changed so that the frequency percentage difference can be smaller than 3%. Specifically, the tone curve generating unit 104 changes the low-luminance side frequency percentage 201 and the high-luminance side frequency percentage 202 in the area 701 to 13%, or changes the low-luminance side frequency percentage 201 and the high-luminance side frequency percentage 202 in the area 702 to 12%. This prevents slopes of tone curves generated from the areas 701 and 702 from greatly differing from each other. As a result, the continuity of tone is obtained in the area 701 and the area 702 after they are subjected to contrast correction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157132, filed Aug. 7, 2015, which is hereby incorporated by reference herein in its entirety.

What is claimed is:

1. An image pickup apparatus that picks up an image of a subject, comprising:
   at least one processor or at least one circuit programmed to function as the following units;
   a detecting unit configured to detect a luminance histogram from an image including the subject;
   a distance measurement unit configured to measure a subject distance from an image pickup apparatus to the subject; and a deciding unit configured to, according to the subject distance, decide a frequency percentage that defines a luminance range in the luminance histogram to calculate a control point for a tone curve used to correct contrast of the image, a tone curve generating unit configured to generate the tone curve based at least on the calculated control point; and a correction unit configured to correct the contrast of the image using at least the generated tone curve;

wherein the frequency percentage is higher when the subject distance is long than when the subject distance is short; and the at least one processor or at least one circuit being further programmed to function as a determination unit configured to determine whether the subject distance is equal to or greater than a predetermined threshold distance, wherein when the subject distance is equal to or smaller than the predetermined threshold distance, the frequency percentage is maintained at a predetermined value.

2. The image pickup apparatus according to claim 1, wherein the at least one processor or at least one circuit is further programmed to function as a dividing unit configured to divide the image into a plurality of areas, wherein said distance measurement unit measures the subject distance for each of the plurality of areas, and said determination unit determines the frequency percentage for each of the plurality of areas according to the subject distance measured for each of the respective areas.

3. The image pickup apparatus according to claim 2, wherein the at least one processor or at least one circuit is further programmed to function as a calculation unit configured to obtain a weighted average of the frequency percentages determined for the respective ones of the plurality of areas to calculate a frequency percentage for use in calculating a control point for the tone curve, wherein a weight coefficient for use in obtaining the weighted average is determined for each of the plurality of areas.

4. The image pickup apparatus according to claim 2, wherein the at least one processor or at least one circuit is further programmed to function as a changing unit configured to, when a difference between the frequency percentage determined for one of the plurality of areas and the frequency percentage determined for another of the plurality of areas is equal to or greater than a predetermined value, change the frequency percentage determined for the another of the plurality of areas so that the difference becomes smaller.

5. A control method for an image pickup apparatus that picks up an image of a subject, comprising:

detecting a luminance histogram from an image including the subject;

measuring a subject distance from an image pickup apparatus to the subject; and deciding, according to the subject distance, a frequency percentage that defines a luminance range in the luminance histogram to calculate a control point for a tone curve used to correct contrast of the image, generating the tone curve based at least on the calculated control point;

correcting the contrast of the image using at least the generated tone curve; and determining whether the subject distance is equal to or greater than a predetermined threshold distance, wherein the frequency percentage is higher when the subject distance is long than when the subject distance is short, and wherein when the subject distance is equal to or smaller than the predetermined threshold distance, the frequency percentage is maintained at a predetermined value.

6. A non-transitory computer-readable storage medium storing a program for causing a computer to execute a control method for an image pickup apparatus that picks up an image of a subject, the control method comprising:

detecting a luminance histogram from an image including the subject;

measuring a subject distance from an image pickup apparatus to the subject; and deciding, according to the subject distance, a frequency percentage that defines a luminance range in the luminance histogram to calculate a control point for a tone curve used to correct contrast of the image, generating the tone curve based at least on the calculated control point, correcting the contrast of the image using at least the generated tone curve; and determining whether the subject distance is equal to or greater than a predetermined threshold distance, wherein the frequency percentage is higher when the subject distance is long than when the subject distance is short, and wherein when the subject distance is equal to or smaller than the predetermined threshold distance, the frequency percentage is maintained at a predetermined value.

* * * * *